United States Patent
Korpi et al.

(10) Patent No.: US 11,337,100 B1
(45) Date of Patent: May 17, 2022

(54) TRANSFER OF CHANNEL ESTIMATE IN RADIO ACCESS NETWORK

(71) Applicant: NOKIA SOLUTIONS AND NETWORKS OY, Espoo (FI)

(72) Inventors: Dani Johannes Korpi, Helsinki (FI); Mikko Aleksi Uusitalo, Helsinki (FI); Janne Matti Juhani Huttunen, Espoo (FI); Mikko Johannes Honkala, Espoo (FI); Leo Mikko Johannes Kärkkäinen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/405,702

(22) Filed: Aug. 18, 2021

(30) Foreign Application Priority Data

Feb. 25, 2021 (FI) .................................... 20215210

(51) Int. Cl.
*H04W 24/10* (2009.01)
*H04L 43/0894* (2022.01)
*H04L 43/50* (2022.01)
*H04L 25/02* (2006.01)

(52) U.S. Cl.
CPC ......... *H04W 24/10* (2013.01); *H04L 25/0202* (2013.01); *H04L 43/0894* (2013.01); *H04L 43/50* (2013.01)

(58) Field of Classification Search
CPC ............... H04W 24/10; H04L 25/0202; H04L 43/0894; H04L 43/50
See application file for complete search history.

(56) References Cited

U.S. PATENT DOCUMENTS

| 11,115,097 | B2* | 9/2021 | Mao ..................... H04B 7/0421 |
| 2010/0246440 | A1 | 9/2010 | Catovic |
| 2016/0286535 | A1 | 9/2016 | Ji et al. |
| 2017/0099616 | A1* | 4/2017 | Tong ..................... H04L 1/0026 |

(Continued)

FOREIGN PATENT DOCUMENTS

| EP | 3016308 A1 | 5/2016 |
| WO | WO 2019/027711 A1 | 2/2019 |

OTHER PUBLICATIONS

Finnish Search Report dated Jun. 17, 2021 corresponding to Finnish Patent Application No. 20215210.

(Continued)

*Primary Examiner* — Brian T O Connor
(74) *Attorney, Agent, or Firm* — Squire Patton Boggs (US) LLP (57) ABSTRACT

According to an aspect, a method in the radio head comprises receiving a reference signal from a terminal device, and computing a channel estimate on the basis of the reference signal and transferring the channel estimate with a first precision level to the network node over a link between the radio head and the network node. The first precision level defines a first number of bits carrying the channel estimate, then the method determines to change the precision level and, in response to the determining, transfers the channel estimate or a further channel estimate with a second precision level to the network node. The second precision level defines a second number of bits carrying the channel estimate or the further channel estimate, the second number being different from the first number.

14 Claims, 7 Drawing Sheets

(56) References Cited

U.S. PATENT DOCUMENTS

| | | | |
|---|---|---|---|
| 2018/0115402 A1 | 4/2018 | Takahashi et al. | |
| 2019/0246420 A1* | 8/2019 | Park | H04W 72/0433 |
| 2019/0288789 A1* | 9/2019 | Li | H04L 47/14 |
| 2021/0050975 A1* | 2/2021 | Rico Alvarino | H04L 5/0051 |
| 2021/0076244 A1* | 3/2021 | Tie | H04L 1/0026 |

OTHER PUBLICATIONS

Communication of Acceptance dated Jun. 17, 2021 corresponding to Finnish Patent Application No. 20215210.

Notification of Reasons for Rejection (non-final) dated Jan. 11, 2022 corresponding to Japanese Patent Application No. 2021-142947 with English Summary thereof.

* cited by examiner

TRANSFER OF CHANNEL ESTIMATE IN RADIO ACCESS NETWORK

FIELD

Various embodiments described herein relate to the field of wireless communications and, particularly, to transferring a channel estimate in a radio access network.

BACKGROUND

In a modern radio access network, radio coverage to served (mobile) terminal devices is provided in the form of a network of radio access nodes that are in some literature called base stations, Nodes B, etc. With the latest evolution versions of the cellular networks, a concept where a single access node has multiple spatially distant remote radio heads (RRH). A single access node or a RRH may serve a particular terminal device and is, thus, configured to process signals received from the terminal device. A channel estimate representing a state of a radio channel between the RRH and a terminal device may be used for various purposes, e.g. for equalization. There may be a need to transfer the channel estimate from the RRH for various signal processing tasks or applications.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a radio head of a network node of a radio access network, comprising: means for receiving a reference signal from a terminal device, computing a channel estimate on the basis of the reference signal and transferring the channel estimate with a first precision level to the network node over a link between the radio head and the network node, wherein the first precision level defines a first number of bits carrying the channel estimate; and means determining to change the precision level and, in response to said determining, transferring the channel estimate or a further channel estimate with a second precision level to the network node, wherein the second precision level defines a second number of bits carrying the channel estimate or the further channel estimate, the second number being different from the first number.

The means may comprise at least one processor and at least one memory including computer program code, wherein the at least one memory and computer program code are configured, with the at least one processor, to cause the apparatus to perform the above-described steps.

In an embodiment, the at least one memory and computer program code are configured, with the at least one processor, to cause the apparatus to monitor a channel quality level and to determine to change the precision level in response to detecting a change in the monitored channel quality level.

In an embodiment, the at least one memory and computer program code are configured, with the at least one processor, to cause the apparatus to receive, from the network node, a channel estimate request indicating the second precision level and, in response to the request, to determine to change the precision level.

In an embodiment, the first precision level and the second precision level define a number of bits per channel coefficient.

In an embodiment, the first precision level and the second precision level define a method for exploiting correlation between channel coefficients to compress the number of bits carrying the channel estimate or the further channel estimate.

According to an aspect, there is provided an apparatus for a network node of a radio access network, comprising: means for receiving, from a radio head over a link between the radio head and the network node, a channel estimate with a first precision level, wherein the first precision level defines a first number of bits carrying the channel estimate; means for determining to change the precision level and, in response to said determining, transmitting to the radio head a message requesting transfer of the channel estimate or a further channel estimate with a second precision level, wherein the second precision level defines a second number of bits carrying the channel estimate or the further channel estimate, the second number being different from the first number; means for receiving, from the radio head, the channel estimate or the further channel estimate with the second precision level; and means for using the channel estimate or the further channel estimate in signal processing.

The means may comprise at least one processor and at least one memory including computer program code, wherein the at least one memory and computer program code are configured, with the at least one processor, to cause the apparatus to perform the above-described steps.

In an embodiment, the at least one memory and computer program code are configured, with the at least one processor, to cause the apparatus to process a signal by using the channel estimate with the precision level, to evaluate a quality of said signal processing, and to determine to change the precision level on the basis of the quality.

In an embodiment, the at least one memory and computer program code are configured, with the at least one processor, to cause the apparatus to determine to reduce the precision level, if the quality of said signal processing is above a quality threshold.

In an embodiment, the at least one memory and computer program code are configured, with the at least one processor, to cause the apparatus to determine to request the radio head to stop transfer of channel estimates, if the quality of said signal processing is above the quality threshold and if the precision level is below a determined precision threshold.

In an embodiment, the at least one memory and computer program code are configured, with the at least one processor, to cause the apparatus to estimate a capacity of the link and to determine to change the precision level, if the estimated capacity is above a threshold.

In an embodiment, the first precision level and the second precision level define a number of bits per channel coefficient.

In an embodiment, the first precision level and the second precision level define a method for exploiting correlation between channel coefficients to compress the number of bits carrying the channel estimate or the further channel estimate, and wherein the at least one memory and computer program code are configured, with the at least one processor, to cause the apparatus to decompress the channel estimate or the further channel estimate by using an inverse of the compression method.

According to an aspect, there is provided a method for a radio head of a network node of a radio access network, comprising: receiving, by the radio head, a reference signal from a terminal device, computing a channel estimate on the basis of the reference signal and transferring the channel estimate with a first precision level to the network node over a link between the radio head and the network node, wherein the first precision level defines a first number of bits carrying the channel estimate; and determining, by the radio head, to change the precision level and, in response to said determining, transferring the channel estimate or a further channel estimate with a second precision level to the network node, wherein the second precision level defines a second number of bits carrying the channel estimate or the further channel estimate, the second number being different from the first number.

In an embodiment, the radio head monitors a channel quality level and determines to change the precision level in response to detecting a change in the monitored channel quality level.

In an embodiment, the radio head receives, from the network node, a channel estimate request indicating the second precision level and, in response to the request, determines to change the precision level.

In an embodiment, the first precision level and the second precision level define a number of bits per channel coefficient.

In an embodiment, the first precision level and the second precision level define a method for exploiting correlation between channel coefficients to compress the number of bits carrying the channel estimate or the further channel estimate.

According to an aspect, there is provided a method for a network node of a radio access network, comprising: receiving, by the network node from a radio head over a link between the radio head and the network node, a channel estimate with a first precision level, wherein the first precision level defines a first number of bits carrying the channel estimate; determining, by the network node, to change the precision level and, in response to said determining, transmitting to the radio head a message requesting transfer of the channel estimate or a further channel estimate with a second precision level, wherein the second precision level defines a second number of bits carrying the channel estimate or the further channel estimate, the second number being different from the first number; receiving, by the network node from the radio head, the channel estimate or the further channel estimate with the second precision level; and using, by the network node, the channel estimate or the further channel estimate in signal processing.

In an embodiment, the network node processes a signal by using the channel estimate with the precision level, evaluates a quality of said signal processing, and determines to change the precision level on the basis of the quality.

In an embodiment, the network node determines to reduce the precision level, if the quality of said signal processing is above a quality threshold.

In an embodiment, the network node determines to request the radio head to stop transfer of channel estimates, if the quality of said signal processing is above the quality threshold and if the precision level is below a determined precision threshold.

In an embodiment, the network node estimates a capacity of the link and determines to change the precision level, if the estimated capacity is above a threshold.

In an embodiment, the first precision level and the second precision level define a number of bits per channel coefficient.

In an embodiment, the first precision level and the second precision level define a method for exploiting correlation between channel coefficients to compress the number of bits carrying the channel estimate or the further channel estimate, and wherein the network node decompresses the channel estimate or the further channel estimate by using an inverse of the compression method.

According to an aspect, there is provided a computer program product embodied on a computer-readable medium and comprising a computer program code readable by a computer, wherein the computer program code configures the computer to carry out a computer process in a radio head of a network node of a radio access network, the computer process comprising: receiving a reference signal from a terminal device, computing a channel estimate on the basis of the reference signal and transferring the channel estimate with a first precision level to the network node over a link between the radio head and the network node, wherein the first precision level defines a first number of bits carrying the channel estimate; determining to change the precision level and, in response to said determining, transferring the channel estimate or a further channel estimate with a second precision level to the network node, wherein the second precision level defines a second number of bits carrying the channel estimate or the further channel estimate, the second number being different from the first number.

According to an aspect, there is provided a computer program product embodied on a computer-readable medium and comprising a computer program code readable by a computer, wherein the computer program code configures the computer to carry out a computer process in a network node of a radio access network, the computer process comprising: receiving, from a radio head over a link between the radio head and the network node, a channel estimate with a first precision level, wherein the first precision level defines a first number of bits carrying the channel estimate; determining to change the precision level and, in response to said determining, transmitting to the radio head a message requesting transfer of the channel estimate or a further channel estimate with a second precision level, wherein the second precision level defines a second number of bits carrying the channel estimate or the further channel estimate, the second number being different from the first number; receiving, from the radio head, the channel estimate or the further channel estimate with the second precision level; and using the channel estimate or the further channel estimate in signal processing.

LIST OF DRAWINGS

Embodiments are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
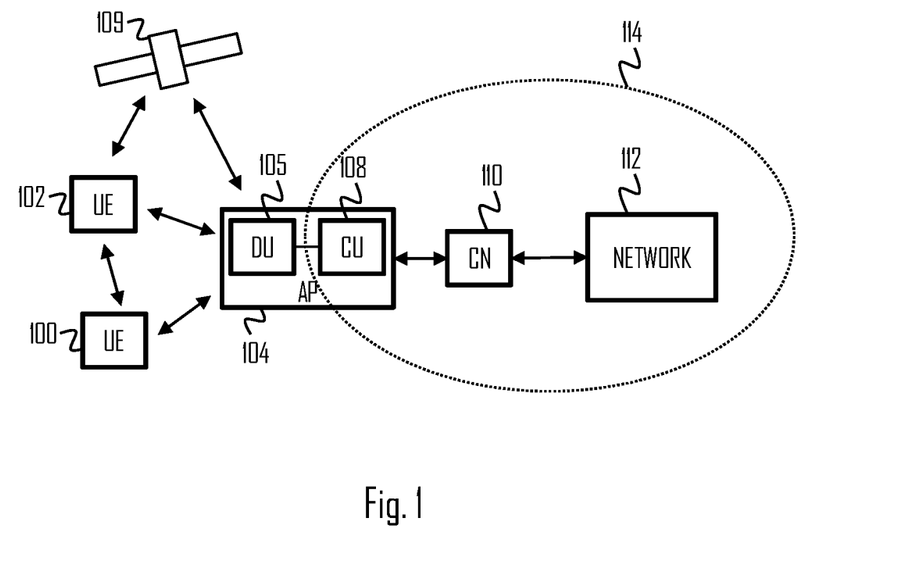
FIGS. 1 and 2 illustrate a wireless communication scenario to which some embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Figure 2:
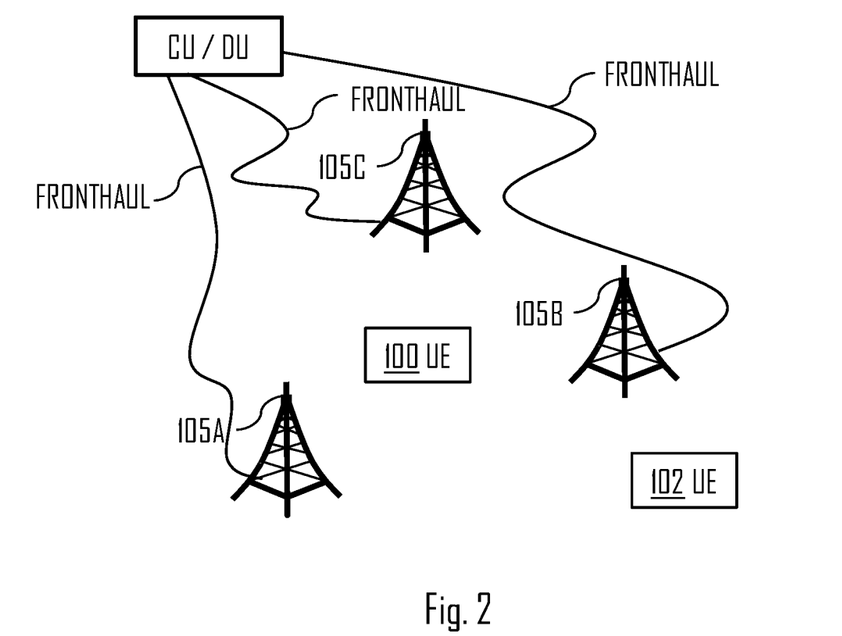

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108). Terminology in the literature may vary but, in some literature, the RRH corresponds to the DU 105. A single CU 108 may have multiple RRHs that are spatially remote with respect to one another, e.g. located at different geographical locations or antenna sites. FIG. 2 illustrates such a scenario where the CU 108 has three RRHs 105, 105A, 105B. An interface between the CU and the RRH (or DU) is F1 interface in the 5G specifications. Such an arrangement enables the CU to employ, for example, spatially distributed multiple-input-multiple-output (MIMO) communications where the CU communicates with different terminal devices simultaneously over the same time-frequency resources via different RRHs. Each RRH may establish a spatial channel to one or more terminal devices served by the RRH, wherein the spatial channel may be substantially orthogonal (or at least distinguishable) with respect to one or more spatial channels formed by one or more other RRHs in the same time-frequency resources. Such a scenario may improve spectral efficiency.

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

FIG. 2 illustrates a scenario where the access node 104 employs multiple RRHs 105A, 105B, 105C connected to the same DU 105 and CU 108. An interface between the RRH and the DU is called a fronthaul link in the 5G specifications, while an interface between the DU and the CU is an F1 interface. Signal processing tasks may be distributed between the RRH, DU and CU. The RRH may perform some low-level (physical layer) signal processing tasks such as channel estimation and equalization, the DU may perform some higher-level (physical layer and optionally link layer) signal processing tasks such as demodulation and decoding, and the CU may perform some even higher level signal processing tasks. A common term for the DU and CU is a network node in the following description. The DU and even CU may perform some signal processing tasks that require information on the radio channel between the RRH and the terminal device. The RRH estimates the channel on the basis of a reference signal received from the terminal device, and the RRH may deliver the channel estimate to the DU and even CU. However, the fronthaul and the F1 interfaces transfer great amounts of traffic, and efficient transfer of any signalling information would be beneficial.

Figure 3:
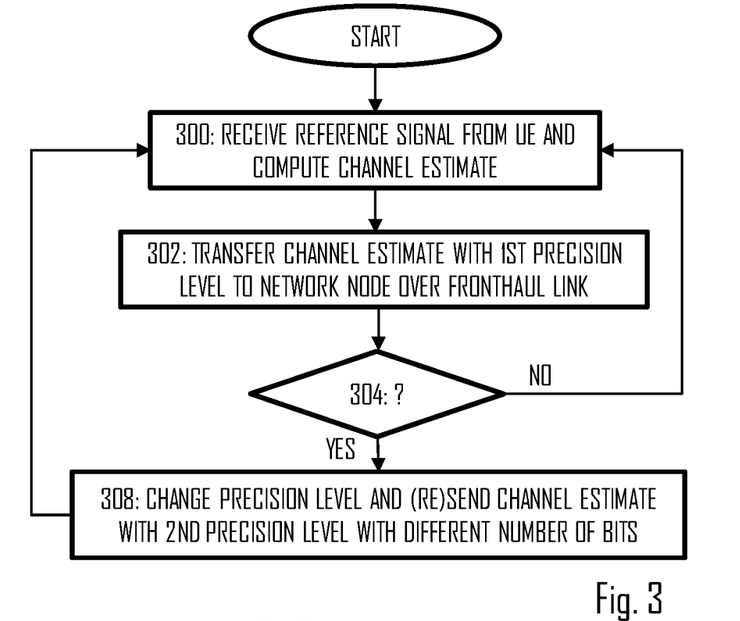
FIGS. 3 and 4 illustrate processes for adapting a precision level of a channel estimate transferred between a radio head and a network node.
Figure 4:
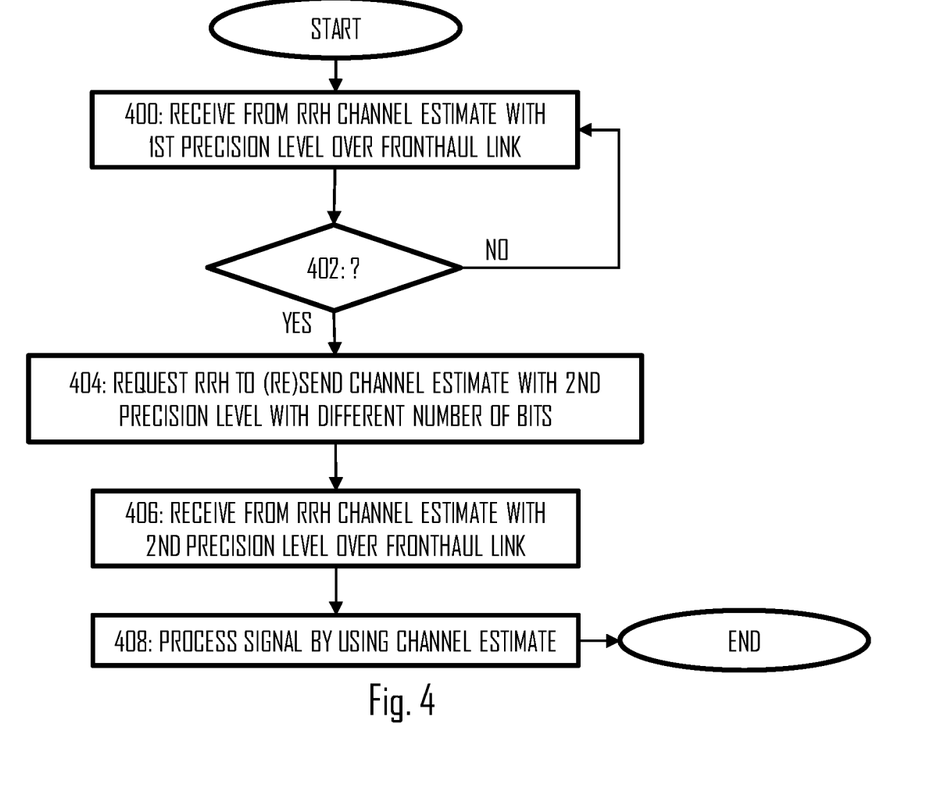

FIG. 3 and illustrate embodiments of processes for transferring the channel estimate. FIG. 3 illustrates a process for the RRH while FIG. 4 illustrates a process for the network node, e.g. the DU or CU. Referring to FIG. 3, the process in the radio head of the network node comprises: receiving (block 300) a reference signal from a terminal device (UE) and computing a channel estimate on the basis of the reference signal; transferring (block 302) the channel estimate with a first precision level to the network node over a link between the radio head and the network node, wherein the first precision level defines a first number of bits carrying the channel estimate; determining (block 304) to change the precision level and, in response to said determining, transferring (block 308) the channel estimate or a further channel estimate with a second precision level to the network node, wherein the second precision level defines a second number of bits carrying the channel estimate or the further channel estimate, the second number being different from the first number. If the first precision level is determined to be sufficient in block 304, the process may return to block 300 for reception of the next reference signal and computation of a new channel estimate.

Referring to FIG. 4, the process in the network node comprises: receiving (block 400), from the radio head over the link between the radio head and the network node, a channel estimate with a first precision level, wherein the first precision level defines a first number of bits carrying the channel estimate; determining (block 402) to change the precision level and, in response to said determining, transmitting (block 404) to the radio head a message requesting transfer of the channel estimate or a further channel estimate with a second precision level, wherein the second precision level defines a second number of bits carrying the channel estimate or the further channel estimate, the second number being different from the first number; receiving (block 406), from the radio head, the channel estimate or the further channel estimate with the second precision level; and using (block 408) the channel estimate or the further channel estimate in signal processing.

In the embodiments of FIGS. 3 and 4, the channel estimates are transferred with an adaptive precision level where each precision level is bound to a determined number of bits used for defining a channel estimate. Accordingly, the number of bits needed for transferring the channel estimate varies in response to the selected precision level. When the channel estimate is transferred with the precision level needed for the signal processing in the network node, the amount of bits transferred over the link can be adapted to the need. This reduces the signalling overhead while ensuring that the precision level is sufficient for the signal processing of block 408. As described in FIG. 4, the network node may initiate the change of the precision level, although some embodiments described below configure the radio head to autonomously detect the need for changing the precision level. The embodiment of FIG. 3 covers both options for changing the precision level, i.e. block 304 may be responsive to the request received from the network node (block 404) or it may be responsive to an internal event in the radio head.

In an embodiment, the first precision level and the second precision level define a number of bits per channel coefficient. In other words, the precision of channel coefficients may be scaled according to the embodiments described herein. For example, the first precision level may indicate a first fixed point number per channel coefficient while the second precision level may indicate a second, different, fixed point number per channel coefficient. When using floating point numbers, the first precision level may define a first total number of bits for the channel estimate while the second precision level may define a second, different total number of bits for the channel estimate. The available number of bits may then be distributed unevenly to define the channel coefficients. Some channel coefficients may be defined with a lower number of bits than other channel coefficients.

In an embodiment, the first precision level and the second precision level define a method for exploiting correlation between channel coefficients to compress the number of bits carrying the channel estimate or the further channel estimate. The radio head may then compress the channel estimate by using the correlation and the compression method, and the network node respectively decompresses the channel estimate or the further channel estimate by using an inverse of the compression method. For example, if the channel coefficients are highly correlated, at least some of the channel coefficients may be skipped and not transmitted. The network node may then compute the missing channel coefficients by using interpolation and the transferred channel coefficients, for example. The number of skipped channel coefficients may vary for different precision levels.

The first number of bits and the second number of bits refer to the number of payload bits used to describe the channel estimate(s). Accordingly, methods used to artificially increase redundancy to the payload bits, e.g. for the purpose of channel encoding or parity check, is not counted into the first and second number of bits. In other words, the first number of bits and second number of bits determine the precision level for the purpose of the signal processing application using the (raw) channel estimate bits in the network node.

Figure 5:
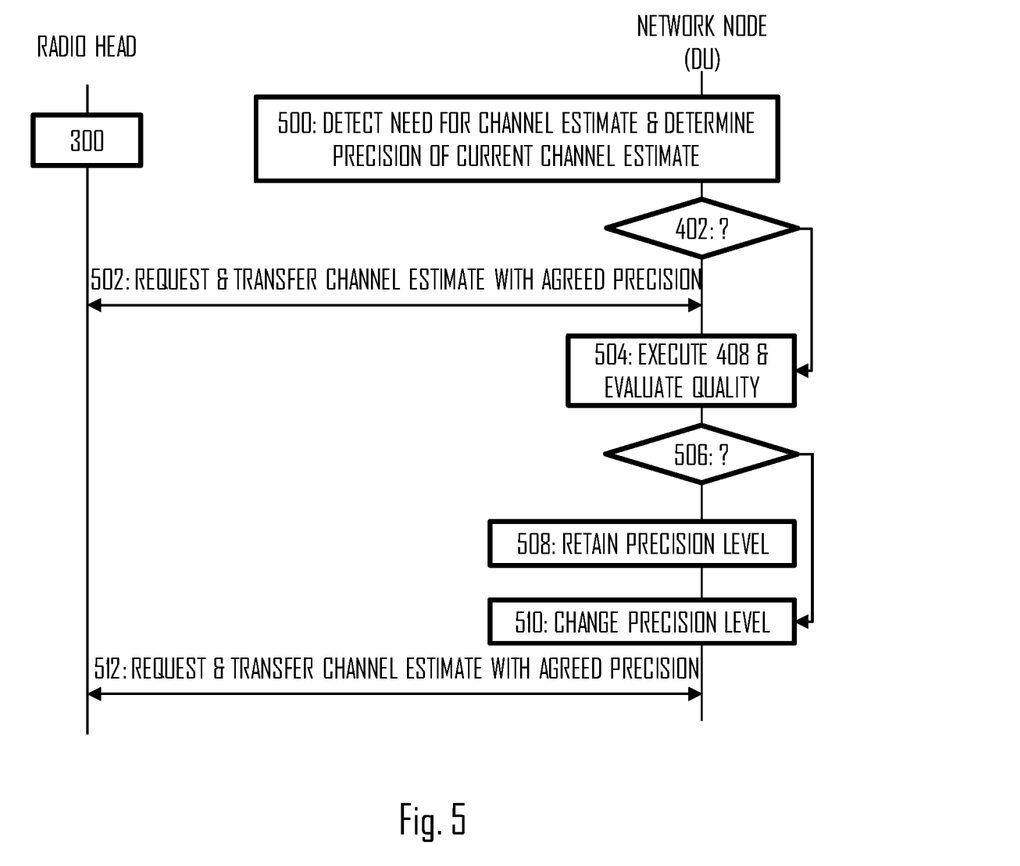
FIGS. 5 and 6 illustrate embodiments of signalling diagrams for network-node-initiated change of the precision level of the channel estimate.

Let us then describe some embodiments of FIGS. 3 and 4 with reference to the signalling diagrams of FIGS. 5 to 8. FIG. 5 illustrates an embodiment where the radio head receives, from the network node, a channel estimate request indicating the second precision level and, in response to the request, to determine to change the precision level. Referring to FIG. 5, the radio head may carry out block 300 in the above-described manner and compute the channel estimate. As described above, the channel estimate may comprise the channel coefficients representing the state of the radio channel between the terminal device and the radio head. As known in the art, the channel coefficients may be frequency-domain samples describing a frequency response of the channel, for example. The radio head may transfer the channel estimates to the network node as they are estimated, with a determined precision level.

In block 500, the network node detects a need for a channel estimate, e.g. in a signal processing application such as demodulation or link adaptation (selection of a modulation and coding scheme). The network node may determine the precision level of the currently available channel estimate (e.g. the first precision level). In block 402, the network node may evaluate whether the current precision level is sufficient for the signal processing application. This may be performed before or after performing the signal processing application, e.g. by the network node. The network node may have stored information on the previously used precision levels and whether or not they have been accurate enough for successful execution of the signal processing application. Accordingly, the network node is capable of evaluating in block 402 whether or not the current precision level has been observed as statistically sufficient for the signal processing application. Another option is to perform the signal processing application with the current precision level, evaluate the performance and, then, determine whether to perform the signal processing application again with the improved precision level. A threshold may be set on the basis of the stored information, and block 402 may comprise comparison between the threshold and the precision level. If the precision level is deemed not high enough in block 402, the process proceeds to step 502 where the network node transmits to the radio head a request to change the precision level and resend the channel estimate with a higher precision level. The network node may explicitly indicate the requested precision level in step 502. In response to the message, the radio head may change the precision level of the channel estimate and transmit it with the higher precision level (e.g. the second precision level) in step 502. Upon receiving the channel estimate with the higher precision level, the network node may proceed with the signal processing application in block 504. If the current precision level was determined to be acceptable in block 402, block 504 may be executed without step 502. Accordingly, no additional traffic to the link is caused if the current precision level is deemed suitable for the signal processing application.

In block 504, the signal processing application is executed by using the channel estimate. Additionally, block 504 may comprise evaluating a quality of the signal processing and outputting a quality metric representing the quality. For example, in case the signal processing application is demodulating and decoding data, the quality metric may indicate whether or not the demodulation and decoding was successful. In other applications, another similar metric may be derived. In block 506, the quality metric is compared with a threshold to determine whether or not the quality provided by the channel estimate was sufficient. If the quality is determined to be sufficient, the process may proceed to block 508 where the current precision level is maintained. Accordingly, upon receiving no contrary request, the radio head may also use the current precision level. In other words, if step 502 was not carried out, the original precision level is maintained. If step 502 was performed, the precision level agreed in step 502 is maintained. On the other hand, if the current precision level is not suitable, e.g. it is determined to be too low or even too high, the process may proceed to block 510 where the precision level is changed. Block 506 may comprise comparison with one threshold or two thresholds: one for determining whether quality was too low and the other for determining whether the quality was too high. Accordingly, the quality evaluation may aim to find a precision level that is just enough for meeting the quality demand. If block 510 is executed, the network node may transmit to the radio head a request (block 512) to change the precision level and send a subsequent channel estimate with a new precision level. The network node may explicitly indicate the requested precision level in step 512. In response to the message, the radio head may change the precision level of the channel estimate and transmit subsequent channel estimate(s) with the new precision level. Upon receiving the channel estimate with the new precision level, the network node may store the channel estimate in a memory for the next iteration of the process of FIG. 5. Reflecting to the embodiment of FIG. 4, blocks 404 and 406 may be comprised in step 502 and/or in step 512.

The procedure of FIG. 5 may be used to adapt the precision level to the required precision by using the quality metric. In practice, the procedure of FIG. 510 may use the one or multiple thresholds to determine, on the basis of the quality metric, whether to increase, retain, or decrease the precision level. When using one threshold, the procedure may gradually reduce the precision level until the precision is found not high enough, which causes the increase of the precision level. Even when using multiple thresholds, the change in block 510 may be incremental, e.g. one bit per channel coefficient may be added/reduced in each iteration or otherwise a determined number of bits may be added/reduced in each iteration.

In an embodiment, the network node requests the radio head to stop transfer of further channel estimates, if the quality of said signal processing is above the quality threshold and if the precision level is below a determined precision threshold. In other words, if acceptable quality is determined to be possible to reach even without the channel estimates, the network node may instruct the radio head to stop transmitting the channel estimates, thus reducing the signalling overhead in the link. Upon detecting that the quality degrades below the threshold, the network node may again request transmission of the channel estimates with the agreed precision level.

Figure 6:
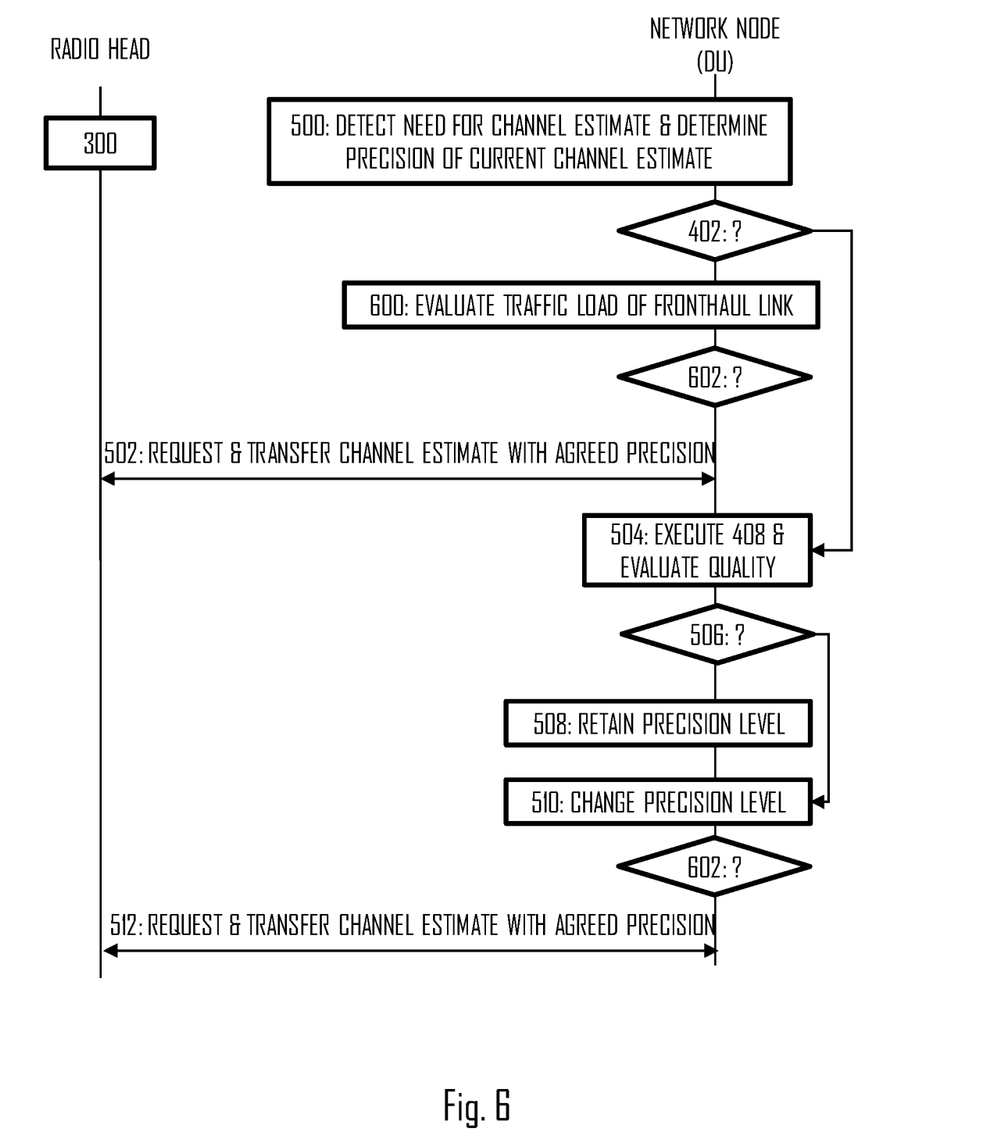

In an embodiment, the network node monitors a capacity of the link, e.g. the fronthaul link, and uses the estimated capacity as a further criterion for determining whether or not to change the precision level. In particular, the link capacity may be taken into account upon determining to increase the precision level of the channel estimate. FIG. 6 illustrates a signalling diagram that is modified from the procedure of FIG. 5. The same reference numbers represent the same functions as in FIG. 5. The network node may monitor the capacity of the link in block 600. Block 600 may comprise evaluating the traffic load or available link capacity to determine whether or not the link can carry further traffic in the form of the channel coefficients with the increased precision level. Upon determining to increase the precision level in block 402 or 506, the link capacity may be compared with a threshold in block 602. The threshold may define a level for determining whether or not the link can carry additional signalling load caused by the increased precision level. Upon determining that the link capacity is too low to accommodate the increase in the precision level, the increase may be overruled. Upon determining that there is capacity available, the increase may be permitted and step 502 or 512 may be carried out.

A determined balancing may be used between the needs from the perspective of the quality metric and the link capacity. Different signal processing application may have different weights for the two parameters, and the weights may be incorporated into the thresholds used in blocks 402, 506, and 602. Some application may set a higher weight to the quality while other applications may set a higher weight to the link capacity. For example, if a higher weight is given to the link capacity in a situation where the quality metric indicates a need for precision level increase while the link is congested, the precision level may actually be decreased in step 512.

Figure 7:
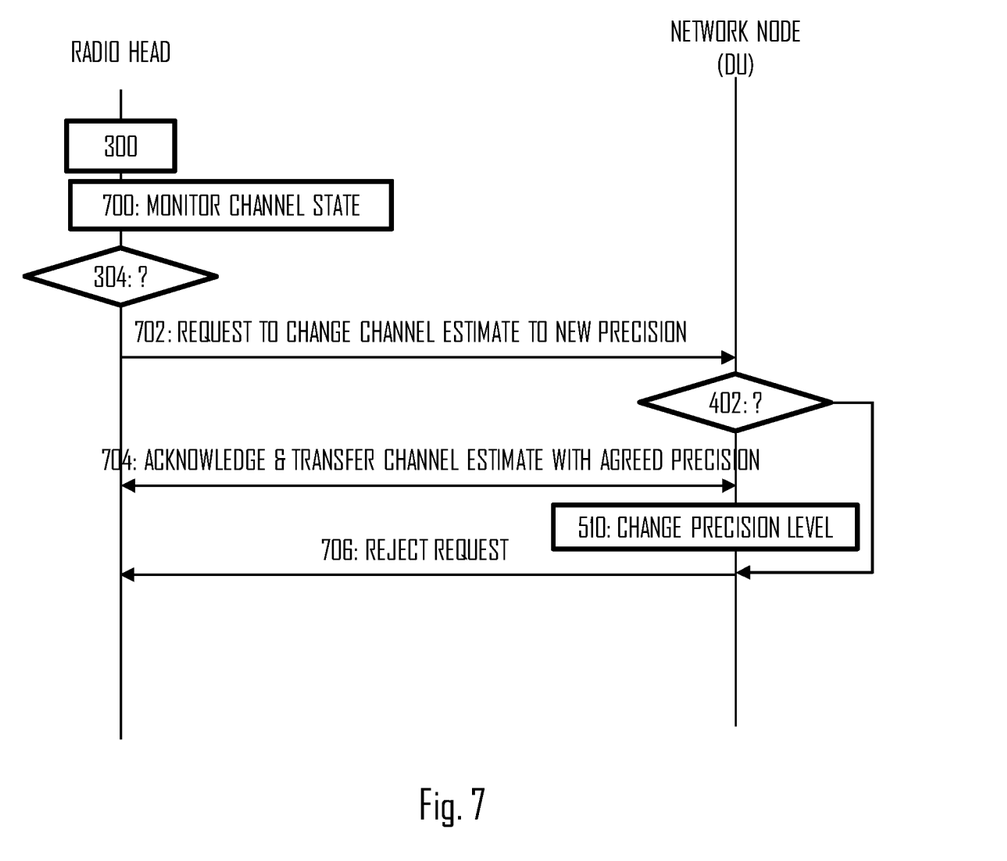
FIG. 7 illustrates an embodiment of a signalling diagram for radio-head-initiated change of the precision level of the channel estimate.

As described above, in an embodiment the radio head autonomously initiates the change of the precision level. The radio head may monitor a channel quality level of the radio channel and determine to change the precision level in response to detecting a change in the monitored channel quality level. FIG. 7 illustrates a signalling diagram of such an embodiment. The same reference numbers as in FIGS. 3 to 5 represent the same or substantially similar operations.

Referring to FIG. 7, block 300 may be carried out in the above-described manner and the radio head may report the channel estimates to the network node with the determined (first) precision level. In block 700, the radio head monitors the channel quality level representing a state of the radio channel. An example of a metric that is monitored in block 700 is a noise level of the radio channel. Upon detecting a change in the channel quality level (block 304), e.g. an increase or decrease in the noise level, the radio head may initiate the change of the precision level. Accordingly, the radio head may transmit in step 702 a request to change the precision level and also indicate the new precision level that is proposed. In block 402, the network node may determine whether or not to accept the new precision level. The decision in block 402 may be based on any one of the embodiments described above in connection with FIGS. 4 to 6. For example, the quality metric and/or the link capacity may be taken into account. Upon determining in block 402 that the request is acceptable, the network node may respond and acknowledge the change of the precision level (step 704). Accordingly, the radio head may change the precision level and transmit the further channel estimate(s) with the agreed precision level. Upon receiving the subsequent channel estimate with the agreed new precision level, the precision level is changed in the network node as well (block 510). On the other hand, upon determining not to change the precision level because of a readily sufficient quality in the signal processing or congestion in the link, for example, the network node may reject the request in step 706. Accordingly, the radio head may maintain the current precision level. The radio head may also refrain from sending a new request (step 702) for a determined time interval. Upon the network node detecting the need for increasing the precision level meanwhile, the procedure of FIG. 5 or 6 may be used.

In a situation where the radio head is currently not transmitting the channel estimate to the network node, the procedure of FIG. 7 may be modified such that the radio head requests transmission of the channel estimate upon detecting decreased channel quality in block 304. Accordingly, step 702 may be modified to be a request to start transmitting the channel estimate with a proposed precision level. If the request is approved in step 704, the radio head may start transmitting the channel estimate with the agreed precision level. In this case, the approval may include a resource allocation grant to transmit the channel estimate over the (fronthaul) link. In a similar manner, the procedure may be used by the radio head to propose to stop transmitting the channel estimate, upon detecting that the channel quality is above a determined threshold. Upon approval in step 704, the radio head may stop transmitting the channel estimate.

As described above, some embodiments may be employed for transmitting the channel estimate again with a changed precision level. For that purpose, the radio head may store the channel estimate for a determined time interval called a channel estimate lifetime. The lifetime may be known to the network node. Upon expiry of the lifetime, the radio head may discard the channel estimate. The lifetime and/or other parameters for the adaptive management of the precision level may be agreed between the radio head and the network node. Such other parameters may include the compression method and the format in which the channel estimate is transferred at each precision level. These parameters enable the extraction and reconstruction of the channel estimate at the network node. The parameters may include, for example, an interpolation method defining, for each precision level, what information is needed by the network node to interpolate channel coefficients that are not transmitted in the channel estimate. For example, different precision levels may be associated with different frequency indices of channel coefficients that shall be transmitted to the network node. The parameters may include a binary format defining a format for the channel estimate and, optionally, a scaling parameter for the channel estimate. The format may indicate, for each precision level, whether the fixed point or floating-point representation is used and at which precision. The scaling factor may define, for each precision level, a value used by the network node to scale the received channel coefficient values.

Above, several examples of the signal processing applications are readily disclosed. A further example is a detection algorithm for determining whether or not the radio head is capable of receiving a signal from a particular terminal device served by another radio head of the network node. The detection procedure may be used to determine whether or not the terminal device interferes with the radio head. A reference signal of the terminal device may be known to the network node because it is served by the network node. The network node may acquire a first equalized signal representing a signal received by the radio head serving the terminal device, the first equalized signal comprising a signal received by the serving radio head from the terminal device. The network node may further acquire a second equalized signal representing a signal received by a radio head not serving the terminal device, wherein the second radio head is spatially distant from the first radio head. The network node may then cross-correlate the first equalized signal with the second equalized signal and determine, on the basis of said cross-correlating, whether or not the second equalized signal also comprises a signal received from the terminal device. This procedure may be used, for example, to determine whether or not to perform interference cancellation at the non-serving radio head in order to reduce the interference from the terminal device. A cross-correlation signal is conventionally compared with a detection threshold used as a basis for detecting whether or not the non-serving radio head receives a signal from the terminal device. This procedure may be improved by performing reverse equalization for the second equalized signal. The reverse equalization may be performed on the basis of the channel estimate received according to any one of the above-described embodiments from the non-serving radio head. The cross-correlation may then be performed between the reverse-equalized second signal and the first equalized signal. A corresponding reverse equalization may be performed for the first equalized signal as well, before the cross-correlation and obviously by using the channel estimate received from the serving radio head. The reverse equalization removes the effect of the (potentially sub-optimal) equalization by the non-serving radio head, thus improving the accuracy of the detection. However, the precision level of the channel estimate available to the network node may affect the performance of the reverse equalization. Accordingly, the quality of the detection may be evaluated according to the embodiment of FIG. 5 or 6, for example. One quality metric may be a result of the detection: if several consecutive detections indicate either confirmed detection or non-detection of the terminal device, this constant behaviour may be deemed to indicate sufficient quality (no false alarms). On the other hand, if the detection result is sporadic, providing alternating detection and non-detection, the network node may determine that false alarms are included in the detections and that an increase in the precision level of the channel estimate is required. Another metric for determining the quality of the detection is by evaluating a result of a cross-correlation signal used as the basis for the detection. When the quality is high, even too high, a peak of the cross-correlation signal indicating the detection, is much higher than the detection threshold. In such a case, lower precision level might provide acceptable results. The difference between the detection threshold and the peak that would trigger the reduction of the precision level may be set according to the desired implementation.

Figure 8:
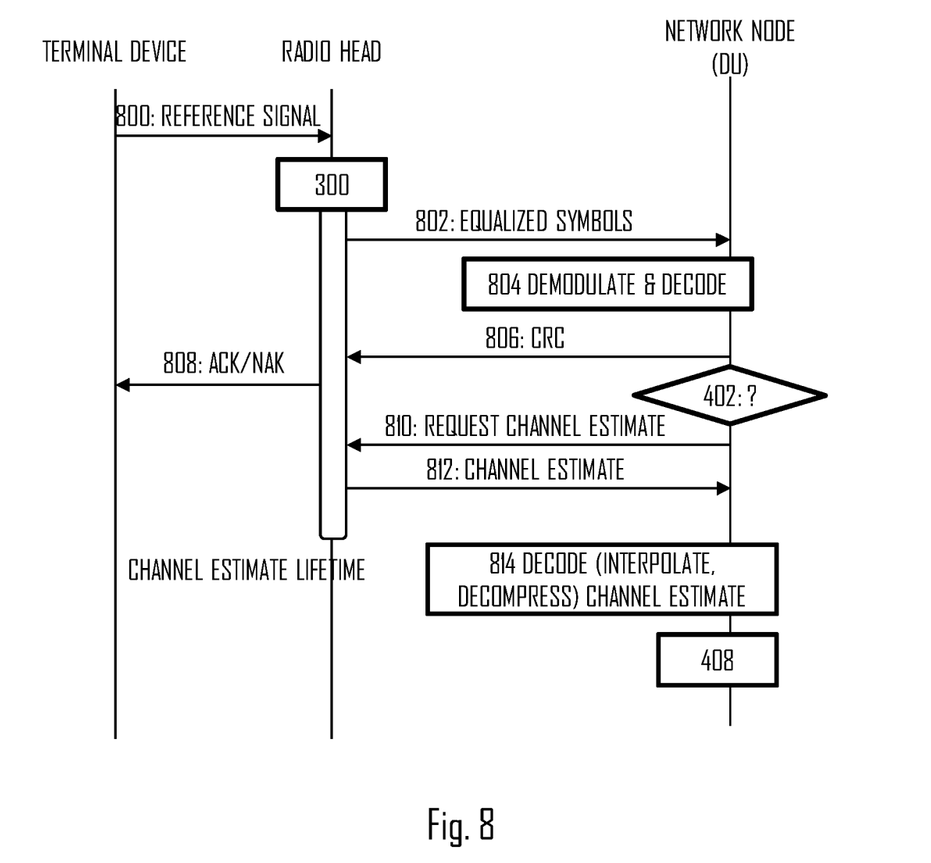
FIG. 8 illustrates yet another embodiment of adapting the precision level of the channel estimate.

FIG. 8 is a yet another embodiment of a procedure for using the channel estimate with an adaptive precision level, e.g. in the terminal device detection procedure described above. Referring to FIG. 8, the terminal device may transmit a reference signal in step 800. Upon receiving the reference signal, the radio head may perform the channel estimation (step 300) and store the channel estimate for the channel estimate lifetime. The channel estimate may be a raw channel estimate comprising channel coefficients computed directly from the reference signal. For example, the reference signal may include reference symbols on selected time-frequency resources, and the raw channel estimate may have the channel coefficients only for those time-frequency resources. In order to determine the channel coefficients for the other time-frequency resources interpolation or another method may be used to span the channel estimate to those time-frequency resources not comprising the reference signal. The radio head may equalize a signal (e.g. data) received together with the reference signal in a transmission resource, e.g. a transmission time interval (TTI). Equalized symbols may be transferred to the network node in step 802 for demodulation and decoding in block 804. Upon decoding and performing error checking via cyclic redundancy check, for example, the result of the error checking may be delivered to the radio head in step 806, and the radio head may transmit an acknowledgment (ACK/NAK) to the terminal device in step 808. The acknowledgment indicates whether or not the decoding was successful, thus indicating to the terminal device whether or not a retransmission is needed.

Additionally, the network node may carry out block 402 according to any one of the above-described embodiments to determine a precision level for the channel estimate. The decision may be based on the error checking and/or the quality of the cross-correlation as the quality metric and/or the link capacity, as described above. In step 810, the network node requests the raw channel estimate with the determined precision level and receives channel coefficients of the raw channel estimate in step 812 with the requested precision level. Then, the network node decodes the channel estimate in block 814, e.g. via interpolation or decompression in the above-described manner. The decoding may include computing channel coefficients for frequency resources (e.g. sub-carriers) for which the raw channel estimate has no channel coefficient. Thereafter, the channel estimate may be used in the signal processing application, e.g. to perform the reverse equalization for the equalized symbols received in step 802 in order to reinstate the channel effect into the symbols. Thereafter, the reverse-equalized symbols may be subjected to the cross-correlation.

It should be appreciated that while the embodiments described above are mainly described in the context that the radio head stores the channel estimates and transfers them to the network node, the channel estimates may equally be stored in the DU and delivered to the CU for the purpose of the signal processing application, and the DU may perform the above-described functions of the radio head.

Figure 9:
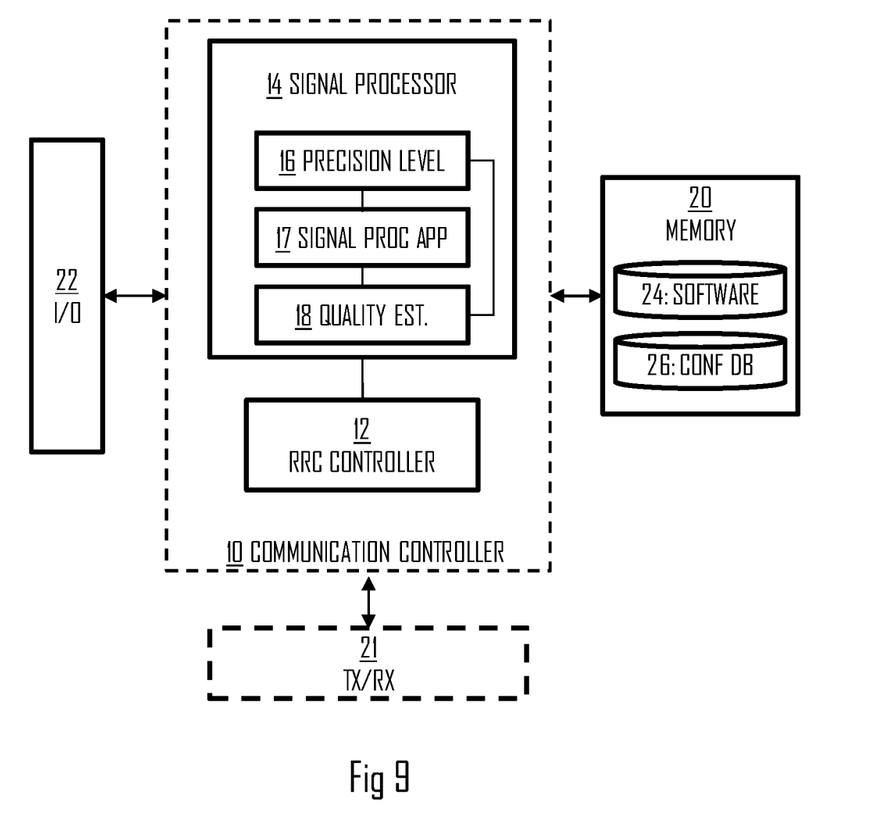
FIGS. 9 and 10 illustrate block diagrams of structures of apparatuses according to some embodiments of the invention.

FIG. 9 illustrates an embodiment of a structure of the above-mentioned functionalities of an apparatus executing the functions of the network node in the embodiments described above, e.g. the process of FIG. 4 or any one of embodiments thereof. As described above, the apparatus for the network node may be configured to use channel estimates in a signal processing task and to receive the channel estimates with an adaptive precision level. In an embodiment, the apparatus may be a circuitry or an electronic device realizing some embodiments of the invention in the network node. The apparatus carrying out the above-described functionalities may thus be comprised in such a device, e.g. the apparatus may comprise a circuitry such as a chip, a chipset, a processor, a micro controller, or a combination of such circuitries for the network node.

Referring to FIG. 9, the apparatus may comprise a communication controller 10 providing the apparatus with capability of performing the above-described functions of the network node. In some embodiments, the apparatus may comprise a communication interface or communication circuitry 22 to communicate with RRHs connected to the network node such as the DU. The interface 22 may operate according to the specifications of the fronthaul interface or F1 interface of 5G networks, depending on the implementation of the network node. However, in some embodiments the above-described procedures may be performed by another network node of the radio access network or even the core network and, in such embodiments, the interface 22 may support another communication protocol. In any case, the network node may acquire the channel estimates via the interface 22.

In some embodiments, the apparatus comprises a second communication interface 21 configured to provide the apparatus with capability of communicating towards the core network 110 or to the CU, depending on the implementation. In some embodiments, the communication interface 21 may also be used to communicate with the other network nodes via wired connections. In the context of 5G networks, the communication interface 22 may be configured for communication over an Xn interface, and/or an NG interface.

The communication controller 10 may comprise at least one processor or a processing circuitry. The apparatus may further comprise a memory 20 storing one or more computer program products 24 configuring the operation of said processor(s) of the apparatus. The memory 20 may be implemented using any suitable data storage technology, such as semiconductor-based memory devices, flash memory, magnetic memory devices and systems, optical memory devices and systems, fixed memory and removable memory. The memory 20 may further store a configuration database 26 storing operational configurations of the apparatus, e.g. the threshold value(s) for various comparisons described above and the precision levels and associated parameters defining the format of the channel estimate for each precision level.

The communication controller may comprise an RRC controller 12 configured to establish, manage, and terminate radio connections between the network node and the terminal devices connected to the network node. The RRC controller 12 may operate under a control of RRC functions that make the decisions of RRC actions such as the handovers. The RRC controller 12 may also perform the interference management described above. The interference controller may receive, as an input, the information on the coverage of terminal devices, e.g. the correlation matrix. The RRC controller may also instruct a coverage monitor circuitry 14 to determine the coverage areas of the terminal devices according to any one of the above-described embodiments.

The communication controller may include a signal processor 14 configured to carry out the above-described signal processing application 17 or task that requires the channel estimate, at least occasionally. For the purpose of the signal processing application, the signal processor 14 may comprise a precision level estimator 16 configured to determine the precision level required for the appropriate operation of the signal processing application. The precision level estimator 16 may be configured to perform the decisions in blocks 402, 506, and/or 602, as described above. The signal processor may further comprise a quality estimator monitoring the performance of the signal processing application 17, e.g by computing the quality metric in block 504.

Figure 10:
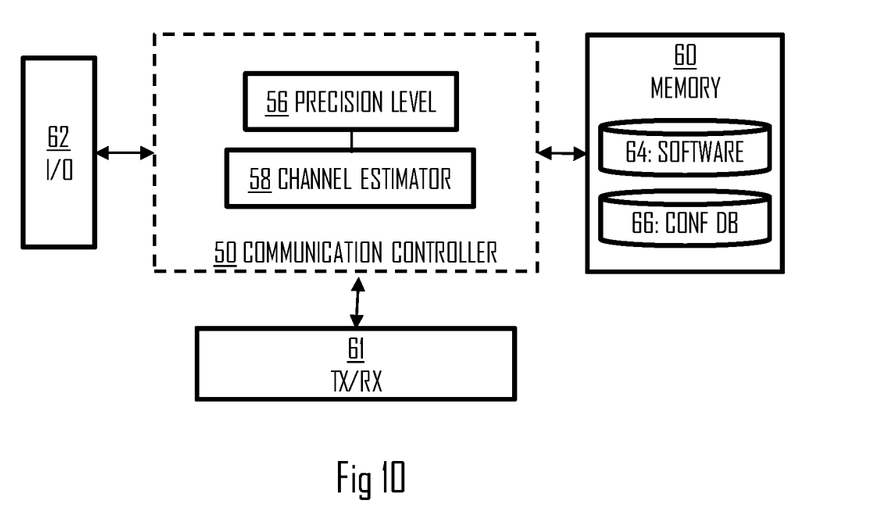

FIG. 10 illustrates an embodiment of a structure of the above-mentioned functionalities of an apparatus executing the functions of the radio head in the embodiments described above, e.g. the process of FIG. 3 or any one of embodiments thereof. As described above, the apparatus for the radio head may be configured to compute the channel estimates from reference signals received from terminal devices and to transfer the channel estimates to the network node with an adaptive precision level. In an embodiment, the apparatus may be a circuitry or an electronic device realizing some embodiments of the invention in the radio head. The apparatus carrying out the above-described functionalities may thus be comprised in such a device, e.g. the apparatus may comprise a circuitry such as a chip, a chipset, a processor, a micro controller, or a combination of such circuitries for the radio head.

Referring to FIG. 10, the apparatus may comprise a communication controller 50 providing the apparatus with capability of performing the above-described functions of the radio head. In some embodiments, the apparatus may comprise a communication interface or communication circuitry 62 to communicate with network node such as the DU. The interface 62 may operate according to the specifications of the fronthaul interface of 5G networks. The apparatus may further comprise a radio communication interface 61 configured to provide the apparatus with capability of communicating over the radio interface with the terminal devices. The radio communication interface may comprise an antenna array, analogue radio frequency components required for the radio communications, and digital baseband signal processing components required to process received signals and to compute the channel estimates.

The communication controller 50 may comprise at least one processor or a processing circuitry. The apparatus may further comprise a memory 20 storing one or more computer program products 24 configuring the operation of said processor(s) of the apparatus. The memory 20 may be implemented using any suitable data storage technology, such as semiconductor-based memory devices, flash memory, magnetic memory devices and systems, optical memory devices and systems, fixed memory and removable memory. The memory 20 may further store a configuration database 26 storing operational configurations of the apparatus, e.g. the precision levels and associated parameters defining the format of the channel estimate for each precision level.

The communication controller may comprise a channel estimator circuitry 58 configured to compute the channel estimate. A common method is to process a reference signal received from the terminal device via the radio interface by using a known reference signal of the reference signal, thus remove the reference signal from the received signal and leaving only a signal representing the radio channel, e.g. the channel coefficients. Such a raw channel estimate may then be stored in the memory 60. In some embodiments, the communication controller 50 may further comprise a precision level estimator 56 configured to monitor the channel state 700 and to determine when to propose a change to the precision level of the channel estimate transferred to the network node, e.g. according to the embodiment of FIG. 7.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIGS. 3 to 8 or any of the embodiments thereof may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for a radio head of a network node of a radio access network, comprising:
   at least one processor; and
   at least one memory including computer program code, wherein the at least one memory and computer program code are configured, with the at least one processor, to cause the apparatus to perform:
   receiving a reference signal from a terminal device, computing a channel estimate on the basis of the reference signal and transferring the channel estimate with a first precision level to the network node over a link between the radio head and the network node, wherein the first precision level defines a first number of bits carrying the channel estimate; and
   determining to change the precision level and, in response to said determining, transferring the channel estimate or a further channel estimate with a second precision level to the network node, wherein the second precision level defines a second number of bits carrying the channel estimate or the further channel estimate, the second number being different from the first number,
   wherein the first precision level and the second precision level define a number of bits per channel coefficient.

2. The apparatus of claim 1, wherein the at least one memory and computer program code are configured, with the at least one processor, to cause the apparatus to monitor a channel quality level and to determine to change the precision level in response to detecting a change in the monitored channel quality level.

3. The apparatus of claim 1, wherein the at least one memory and computer program code are configured, with the at least one processor, to cause the apparatus to receive, from the network node, a channel estimate request indicating the second precision level and, in response to the request, to determine to change the precision level.

4. The apparatus of claim 1, wherein the determining to change the precision level from the first precision level to the second precision level is based on correlation between channel coefficients.

5. An apparatus for a network node of a radio access network, comprising:
   at least one processor; and
   at least one memory including computer program code, wherein the at least one memory and computer program code are configured, with the at least one processor, to cause the apparatus to perform:
   receiving, from a radio head over a link between the radio head and the network node, a channel estimate with a first precision level, wherein the first precision level defines a first number of bits carrying the channel estimate;
   determining to change the precision level and, in response to said determining, transmitting to the radio head a message requesting transfer of the channel estimate or a further channel estimate with a second precision level, wherein the second precision level defines a second number of bits carrying the channel estimate or the further channel estimate, the second number being different from the first number;
   receiving, from the radio head, the channel estimate or the further channel estimate with the second precision level; and
   using the channel estimate or the further channel estimate in signal processing,
   wherein the first precision level and the second precision level define a number of bits per channel coefficient.

6. The apparatus of claim 5, wherein the at least one memory and computer program code are configured, with the at least one processor, to cause the apparatus to process a signal by using the channel estimate with the precision level, to evaluate a quality of said signal processing, and to determine to change the precision level on the basis of the quality.

7. The apparatus of claim 6, wherein the at least one memory and computer program code are configured, with the at least one processor, to cause the apparatus to determine to reduce the precision level, if the quality of said signal processing is above a quality threshold.

8. The apparatus of claim 7, wherein the at least one memory and computer program code are configured, with the at least one processor, to cause the apparatus to determine to request the radio head to stop transfer of channel estimates, if the quality of said signal processing is above the quality threshold and if the precision level is below a determined precision threshold.

9. The apparatus of claim 5, wherein the at least one memory and computer program code are configured, with the at least one processor, to cause the apparatus to estimate a capacity of the link and to determine to change the precision level, if the estimated capacity is above a threshold.

10. The apparatus of claim 5, wherein the first precision level and the second precision level define a method for exploiting correlation between channel coefficients to compress the number of bits carrying the channel estimate or the further channel estimate, and wherein the at least one memory and computer program code are configured, with the at least one processor, to cause the apparatus to decompress the channel estimate or the further channel estimate by using an inverse of the compression method.

11. A method for a radio head of a network node of a radio access network, said method comprising:
   receiving, by the radio head, a reference signal from a terminal device, computing a channel estimate on the basis of the reference signal and transferring the channel estimate with a first precision level to the network node over a link between the radio head and the network node, wherein the first precision level defines a first number of bits carrying the channel estimate; and
   determining, by the radio head, to change the precision level and, in response to said determining, transferring the channel estimate or a further channel estimate with a second precision level to the network node, wherein the second precision level defines a second number of bits carrying the channel estimate or the further channel estimate, the second number being different from the first number,
   wherein the first precision level and the second precision level define a number of bits per channel coefficient.

12. A method for a network node of a radio access network, said method comprising:
   receiving, by the network node from a radio head over a link between the radio head and the network node, a channel estimate with a first precision level, wherein the first precision level defines a first number of bits carrying the channel estimate;
   determining, by the network node, to change the precision level and, in response to said determining, transmitting to the radio head a message requesting transfer of the channel estimate or a further channel estimate with a second precision level, wherein the second precision level defines a second number of bits carrying the channel estimate or the further channel estimate, the second number being different from the first number;
   receiving, by the network node from the radio head, the channel estimate or the further channel estimate with the second precision level; and
   using, by the network node, the channel estimate or the further channel estimate in signal processing,
   wherein the first precision level and the second precision level define a number of bits per channel coefficient.

13. A computer program embodied on a non-transitory computer-readable medium, said computer program comprising computer program code readable by a computer, wherein the computer program code configures the computer to carry out a computer process in a radio head of a network node of a radio access network, the computer process comprising:
   receiving a reference signal from a terminal device, computing a channel estimate on the basis of the reference signal and transferring the channel estimate with a first precision level to the network node over a link between the radio head and the network node, wherein the first precision level defines a first number of bits carrying the channel estimate; and
   determining to change the precision level and, in response to said determining, transferring the channel estimate or a further channel estimate with a second precision level to the network node, wherein the second precision level defines a second number of bits carrying the channel estimate or the further channel estimate, the second number being different from the first number,
   wherein the first precision level and the second precision level define a number of bits per channel coefficient.

14. A computer program embodied on a non-transitory computer-readable medium, said computer program comprising computer program code readable by a computer, wherein the computer program code configures the computer to carry out a computer process in a network node of a radio access network, the computer process comprising:
   receiving, from a radio head over a link between the radio head and the network node, a channel estimate with a first precision level, wherein the first precision level defines a first number of bits carrying the channel estimate;
   determining to change the precision level and, in response to said determining, transmitting to the radio head a message requesting transfer of the channel estimate or a further channel estimate with a second precision level, wherein the second precision level defines a second number of bits carrying the channel estimate or the further channel estimate, the second number being different from the first number;
   receiving, from the radio head, the channel estimate or the further channel estimate with the second precision level; and
   using the channel estimate or the further channel estimate in signal processing,
   wherein the first precision level and the second precision level define a number of bits per channel coefficient.

* * * * *